United States Patent [19]
Greenblatt

[11] Patent Number: 4,603,624
[45] Date of Patent: Aug. 5, 1986

[54] MOTORIZED NUTCRACKER

[76] Inventor: Abraham J. Greenblatt, 6722 Waggoner Dr., Dallas, Tex. 75230

[21] Appl. No.: 734,978

[22] Filed: May 16, 1985

[51] Int. Cl.$^4$ ............................................. A23N 5/00
[52] U.S. Cl. ..................................... 99/572; 99/579; 99/580; 99/582
[58] Field of Search ................. 99/568, 571, 572, 573, 99/579–583; 426/481–483

[56] References Cited

U.S. PATENT DOCUMENTS

| | | | |
|---|---|---|---|
| 537,477 | 4/1895 | North | 99/581 |
| 1,038,229 | 9/1912 | Suzzi | 99/580 |
| 1,208,324 | 12/1916 | Jones | 99/572 |
| 1,255,808 | 2/1918 | Spencer | 99/581 |
| 1,606,226 | 11/1926 | Hopkins et al. | 99/575 |
| 2,144,841 | 1/1939 | Glaser | 99/574 |
| 3,713,468 | 1/1973 | Walsh | 99/580 |
| 4,034,665 | 7/1977 | McFarland et al. | 99/574 |
| 4,350,088 | 9/1982 | Rubio, Jr. | 99/574 |
| 4,448,115 | 5/1984 | Volk, Sr. | 99/574 |
| 4,526,092 | 7/1985 | Greenblatt et al. | 99/579 X |

OTHER PUBLICATIONS
Advertisement for "Kinetic Kracker".
Advertisement for "The New Dynamic Nut Cracker".

*Primary Examiner*—Timothy F. Simone
*Attorney, Agent, or Firm*—Hubbard, Tucker, Turner & Tucker

[57] ABSTRACT

A nutcracker includes a frame having a jaw member mounted thereon and connected to a threaded support portion for movement relative to said frame to adjust for the size of nuts being cracked. A second jaw member is mounted juxtaposed to the first jaw member and is pivotally supported on said frame for oscillating movement by a rotating cam. A nut support member has a trough portion which is disposed below and between the jaw members in their minimum spaced position to crush a nut for supporting the nut for engagement by the jaw members and for movement to discharge a nut into a container disposed below the jaw members after the shell cracking or crushing cycle is completed.

10 Claims, 3 Drawing Figures

MOTORIZED NUTCRACKER

BACKGROUND OF THE INVENTION

1. Field of the Invention

The present invention pertains to a motorized nutcracker wherein opposed nut engaging jaws are movable relative to each other to crush the shell of a nut or similar shell enclosed kernals.

2. Description of Related Art

Various types of nuts require or are advantageously cracked to minimize nutmeat loss and breakage by a particular type of crushing or squeezing action. For example, the shells of walnuts and pecans are more effectively broken without damaging the nutmeat by a crushing action directed along the longitudinal axis of the shell. In this regard, certain types of nutcrackers have been developed which are characterized by a stationary jaw and a movable jaw which is accelerated toward the stationary jaw to impact a shell enclosed nut disposed between the jaws to effect shell breakage. Control over the crushing action is very erratic and difficult with this type of nutcracker even though the basic direction of force exertion on the shell is along the longitudinal central axis of the nut.

Accordingly, there has been a need for improvements in nutcrackers which are adapted for directing the shell cracking forces longitudinally along the shell axis with a relatively controlled engagement and disengagement of the nut between a pair of opposed shell cracking jaws and yet wherein the speed of production of cracked nuts is substantially greater than manually actuated cracking apparatus. The present invention provides certain other advantages in the art of nutcrackers which will be appreciated by those skilled in the art upon reading the following summary and detail description.

SUMMARY OF THE INVENTION

The present invention provides an improved motorized nutcracker of a type wherein a pair of opposed cracking jaws are movable relative to each other by mechanism for moving at least one of the jaws and wherein a reciprocating crushing action with axial directed crushing forces is imposed on shell enclosed nuts such as walnuts and pecans.

In accordance with an important aspect of the invention there is provided a motorized nutcracker having a first jaw with a recess for receiving a portion of a nut shell and a second jaw which is movable in a generally reciprocating manner relative to the first jaw to effect a crushing action on a nut shell interposed between the jaws. The second jaw is actuated by a mechanism for effecting reciprocation of the jaw and, in particular, comprises a roller cam engageable with a jaw supporting member which is mounted for pivotal movement about a pivot axis. The second jaw is freely movable relative to the actuating mechanism whereby the second jaw may be positioned relative to the first jaw to gauge the required distance therebetween for cracking nuts of a predetermined size. The first jaw is preferably adjustable relative to a support frame for both the first and second jaws.

In accordance with yet another aspect of the invention there is provided a motorized nutcracker wherein a pair of jaws are reciprocable relative to each other between shell crushing and noncrushing positions and a nut whose shell is to be crushed or cracked is supported on a support member disposed below the shell cracking jaws and is operable to move to dump a nut whose shell has been cracked into a storage container or the like. The nut supporting member is operable at will to remove a nut from between the shell cracking jaws if sufficient cracking effort has been completed or if not, one of the jaws may be adjusted relative to the other jaw for a second shell cracking cycle without moving the nut from a position to be cracked.

Those skilled in the art will recognize the above noted features of the present invention as well as other superior aspects thereof upon reading the detailed description which follows in conjunction with the drawing.

DESCRIPTION OF THE PREFERRED EMBODIMENT

Figure 1:
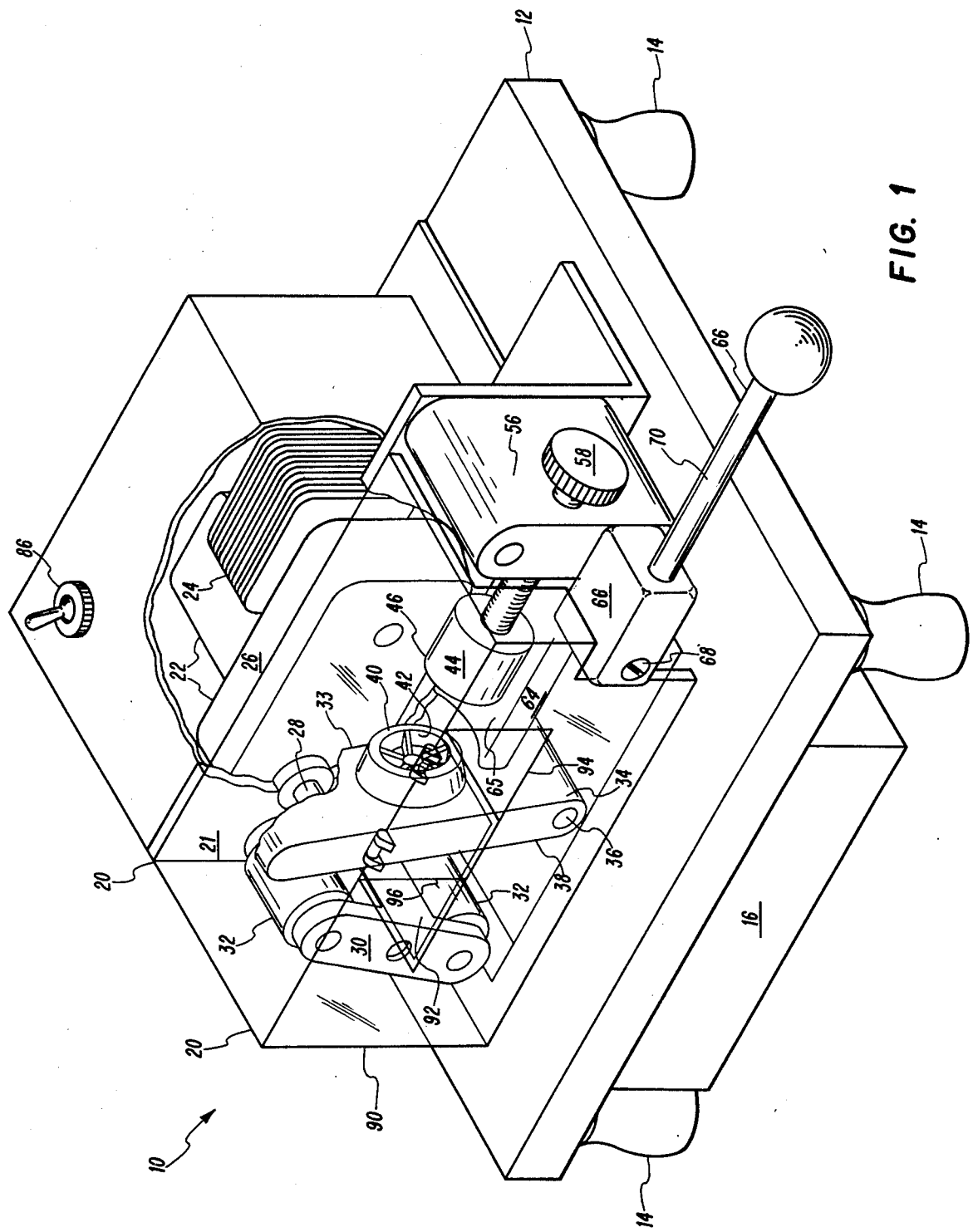
FIG. 1 is a perspective view of the improved nutcracker of the present invention.

In the description which follows like parts are marked throughout the specification and drawing with the same reference numerals, respectively. The drawing figures are not necessarily to scale and certain features of the invention may be shown exaggerated in scale or in somewhat schematic form in the interest of clarity and conciseness.

Referring to the drawing figures, the motorized nutcracker of the present invention is illustrated and generally designated by the numeral 10. The nutcracker 10 includes a generally planar horizontally extending support base 12 which is disposed on spaced apart legs 14 to define a space under the support base for receiving a cracked nut storage container 16. The container 16 may be secured to the base 12 and formed as a slidable drawer or the like for movement relative to the base. The container 16 is normally disposed under an opening 18 in the base 12 through which cracked nuts are discharged from the mechanism of the nutcracker to be described hereinbelow. The base 12 supports a generally upstanding planar frame plate 20 which is adapted to support a motor and speed reduction gear drive unit 22 including an electric drive motor 24 and a speed reduction drive housing 26 in which a suitable reduction gear train, not shown, is disposed. An output shaft 28 extends from the housing 26 and through a suitable opening in the support plate 20 and is adapted to support and be drivably connected to a cam member 30. The cam member 30 is configured to support a pair of opposed roller cams 32 which are supported in suitable bearing means, not shown, for rotation relative to the member 30 and are diametrally opposite each other with respect to an axis of rotation of the shaft 28.

Referring to FIG. 1, the nutcracker 10 includes a somewhat reciprocable or, technically, an oscillating jaw member 33 comprising a support arm 34 mounted on the frame plate 20 for pivotable movement about a pivot support pin 36. The jaw support member 34 includes a cam surface 38 which is engageable by the roller cams 32 as the shaft 28 is rotated to effect oscillating movement of the jaw member 33 about the axis of the support pin 36. The jaw member 33 includes a generally circular boss 40 which projects from the face of the member 33 opposite the cam surface 38 and includes a generally conical recess 42. The cam member 30 is operable to oscillate the jaw member 33 about its pivot axis between a fully reclined position 80 (FIG. 2) and a fully extended position toward an opposing jaw member generally designated by the numeral 84. In the arrangement of the nutcracker 10 the location of the shaft 28 axis relative to the pivot axis of the pin 36 and the radial spacing of the roller cams 32 relative to the shaft 28 axis is such that the jaw member 33 is always biased by gravity forces to remain in engagement with the cams 32 of the cam member even when the jaw member 33 is fully extended in a clockwise direction toward the jaw member 44. Moreover, the jaw member 33 may be moved manually relative to the cam member 30 toward the jaw member 44 to assist in preselecting the minimum spacing between these members during operation of the nutcracker.

Figure 2:
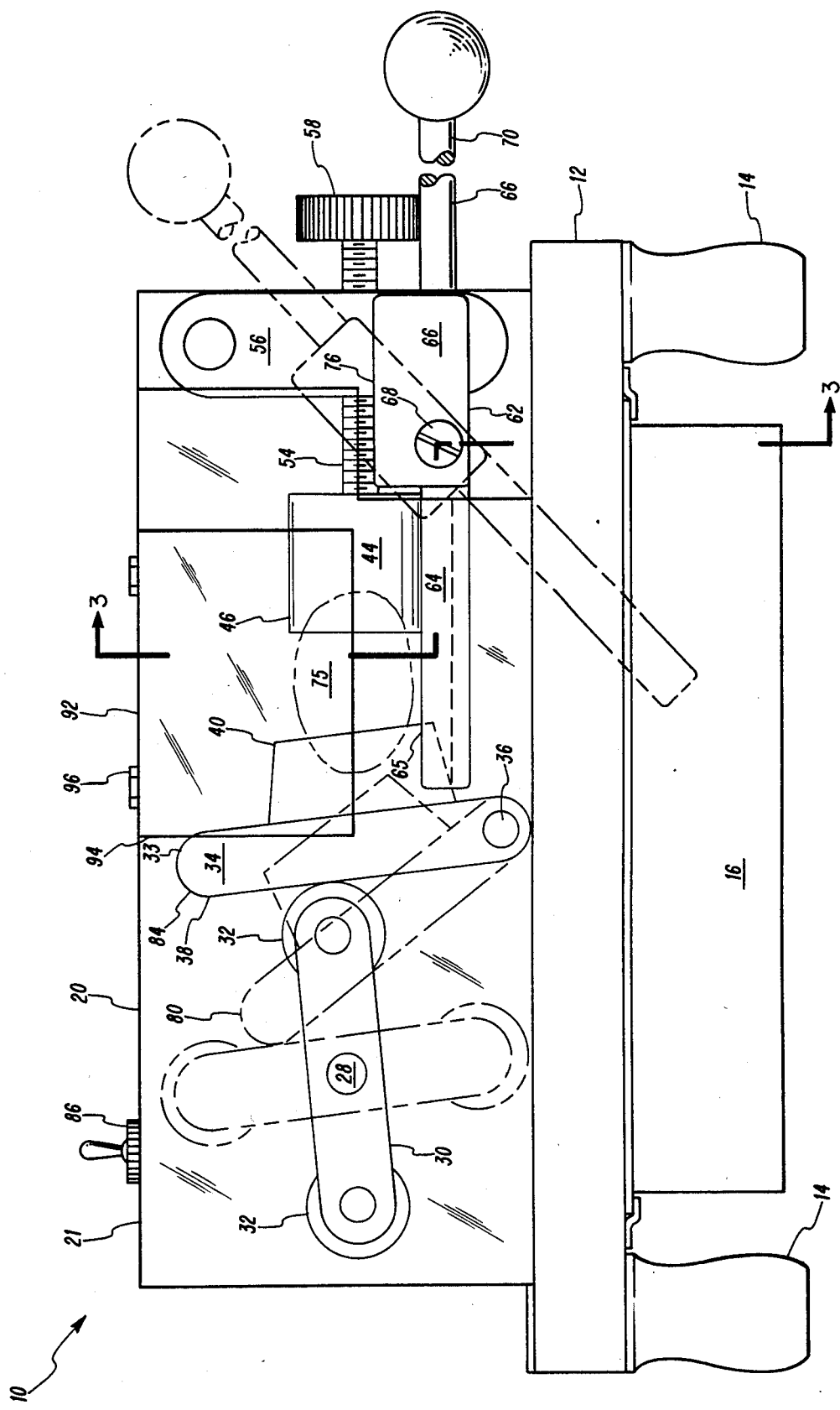
FIG. 2 is a front elevation of the nutcracker illustrated in FIG. 1.
Figure 3:
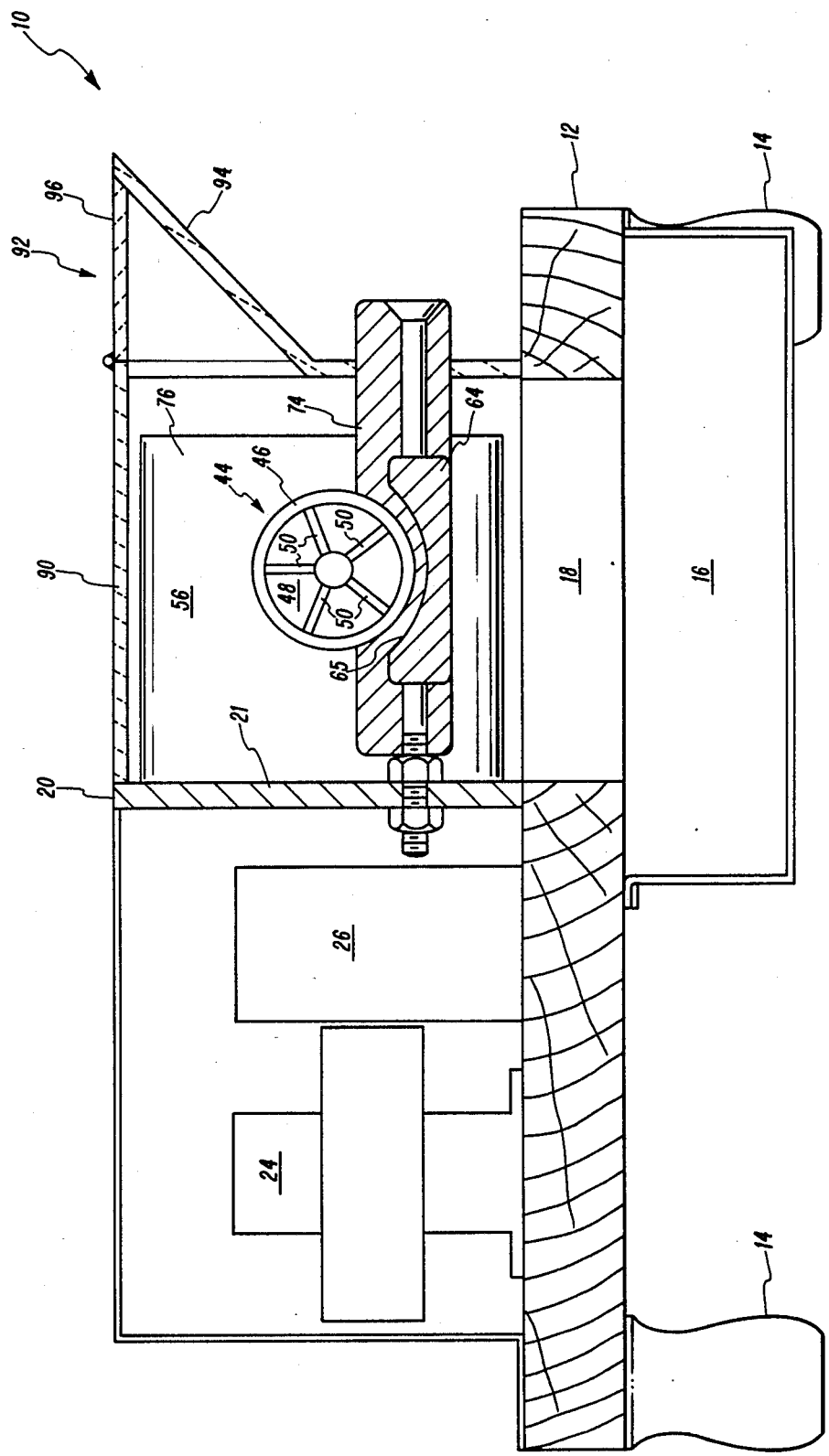
FIG. 3 is a section view taken along the line 3—3 of FIG. 2.

Referring further to FIG. 2 and FIG. 3, the jaw member 44 includes a generally circular boss 46 having a conical recess 48 formed therein and generally opposite the recess 42 when the jaw member 33 is disposed directly opposite the jaw member 44. The recess 48 is preferably formed to have an included angle of about 120° and a plurality of radially spaced ribs 50 which project from the surface of the recess and assist in maintaining a nut in position during the shell cracking process and also to effect penetration of the shell so that a generally uniform fracturing effort takes place circumferentially around the nutshell.

The jaw member 44 includes a threaded screw portion 54 which extends through an internally threaded portion of a support member 56 forming part of the frame plate 20 and extending normal to the surface 21 of the frame plate. A manually graspable adjusting knob 58 is attached to the end of the threaded member 54 opposite the boss 46 whereby the jaw member 44 may be adjusted relative to the support member 56 and the cam actuated limit position of the jaw member 33.

The nutcracker 10 also includes a nut support member generally designated by the numeral 62 having a somewhat trough shaped nut support portion 64 and a crank arm 66. The nut support member 62 is mounted on the support plate 56 for rotation relative thereto by a supporting pin 68. An elongated handle portion 70 extends from the crank arm 66 for actuating the support member to pivot about the axis of the pin 68 whereby the trough portion may be moved in a counterclockwise direction, viewing FIG. 2, to dump a nut supported thereon into the container 16. The nut support member 62 is weighted to tend to move in a clockwise direction, viewing FIG. 2 into the position illustrated wherein a stop surface 74 engages a cooperating surface 76 on the plate member 56. The trough shaped portion 64 includes a recess 65 which is adapted to receive at least a portion of the bosses 40 and 46, respectively so that a nut such as the walnut 75, shown in FIG. 2, when disposed on the trough portion 64 is engageable by the jaws formed by the bosses 40 and 46 to effect cracking of the shell of the nut as the jaw member 33 is brought into forcible engagement by rotation of the cam member 30.

The operation of the nutcracker 10 will now be described with reference to the drawing figures. The motor 24 is adapted to be connected to a source of electric power, not shown, and may be energized and deenergized by operation of a switch 86, FIG. 1. The nutcracker may be used to crack various sizes of nuts but, of course, is operated most efficiently when preset for a particular size of nut in accordance with a graded batch or quantity. For example, if a nut of a selected size is to be cracked it is typically placed with its longitudinal axis, if present, running generally parallel to the longitudinal extent of the trough or recess 65 and supported on the support portion 64. The jaw member 33 is then manually positioned in its limit position toward the jaw member 44 and engaged with the nut. Suitable indicia on the surface 21 of the support plate 20 may be provided to indicate the clockwise limit position of the jaw member 33 with respect to its axis of rotation. The jaw member 44 is then adjusted by rotating the threaded member 54 until the boss 46 is in a position which would effect substantial cracking of the nut shell of the nut 75, for example. The first nut of a batch may, in fact, be manually cracked by rotating the threaded member until the minimum distance between the jaw recesses 42 and 48 is such that the shell is suitably crushed. The motor 22 may then be energized with a nut 75 in the cracking position whereby the cams 32 will cause the jaw member 33 to oscillate toward and away from the jaw member 44. The jaw member 33 rotates in a clockwise direction, viewing FIG. 2, to crush the nutshell between the jaw members 33 and 34. As the jaw member 33 oscillates away from the nut in a counterclockwise direction, viewing FIG. 2, the handle 70 may be rotated to effect tipping of the nut support member 64 in a counterclockwise direction to dump the nut with its broken shell into the container 16. Force of gravity preferably operates on the support member 62 to return it to the working position illustrated by the solid lines in FIG. 2. If a nut is not sufficiently crushed during the first oscillation of the jaw member 33 toward the jaw member 44, the position of the jaw member 44 may be rapidly adjusted by the operator of the nutcracker by rotating the knob 58 to effect movement of the threaded member 54 in one direction or another in accordance with the desired degree of cracking of the shell. Accordingly, if a nut is placed in the trough portion 65 and during an oscillation of the jaw member 33 an insufficient cracking of the shell or an over cracking or crushing of the shell and the nutmeat occurs, the jaw member 44 may be repositioned conveniently without stopping the operation of the apparatus. In this regard, the speed of rotation of the cam support member 30 is on the order of six revolutions per minute which is suitably slow as to enable even an unskilled operator an opportunity to adjust the position of the jaw member 44 for the next oscillation cycle of the jaw member toward the jaw member 44. A relatively unskilled operator may also easily adapt to placing a nut on the nut support portion 64 during the phase of the operating cycle of the jaw member 33 when it is furthest away from the nut support member and viewing the operation of the nutcracker as the jaw member 33 moves to forcibly crack or crush a shell between the jaw members 33 and 44. Once a sufficient number of nuts has been cracked to fill the container 16, the container may be removed from under the frame 12 to sort the nutmeats from the broken shell pieces and carry out other processing thereof.

The nutcracker 10 may be manufactured with conventional engineering materials for virtually all of the components including cast metals such as aluminum or a reinforced nylon plastic. The actuating mechanism described above, including the opposed jaw members 33 and 44 and the nut support member 64, may be enclosed in a transparent plastic shield or barrier 90 having a top opening 92 above an inclined chute 94, with a hinged cover 96. The transparent barrier 90 across the front side adjacent the jaw member 33 and 44 permits the operator of the nutcracker to view the operation thereof, thus allowing the operator to adjust the jaw member 44 as needed when insufficient cracking of the shell or an overcracking or crushing of the shell and the nutmeat occurs. The transparent barrier 90 interlocks with the frame plate 20 in a conventional manner, and preferably is easily removable for cleaning.

Although a preferred embodiment of the invention has been described in detail herein those skilled in the art will recognize that various substitutions and modifications may be made to the specific embodiment shown and described without departing from the scope and spirit of the invention as recited in the appended claims.

What is claimed is:

1. A nutcracker apparatus comprising:
    a frame including means for supporting first and second jaw containing members thereon;
    said first jaw containing member being supported on said frame by pivot means defining a pivot axis displaced from the jaw contained thereon for said first jaw containing member to be oscillated about said pivot axis toward and away from said second jaw containing member, said second jaw containing member being mounted stationary on said frame and facing said first jaw containing member;
    means operable for engagement against said first jaw containing member for oscillating said first jaw containing member to move toward said second jaw containing member to effect crushing of a shell enclosed nut positioned between said jaw containing members; and
    a nut support member disposed generally below and extending between said first and second jaw containing members in the shell crushing position of said jaw containing members relative to each other for supporting a nut to be crushed between said jaw containing members.

2. The nutcracker set forth in claim 1 wherein:
    said nut support member is mounted on said frame for movement between a nut supporting position and a nut discharging position for discharging a nut which has been crushed between said jaw containing members, said nut support member including manually operable means for moving said nut support member at least from said nut supporting position to said nut discharging position.

3. The nutcracker set forth in claim 2 wherein:
    said nut support member includes a trough portion having a recess for supporting a nut in a position to be engaged by said first and second jaw containing members.

4. The nutcracker set forth in claim 1 wherein:
    said second jaw containing member includes a threaded member threadedly engaged with means on said frame for movement of said second jaw containing member to a predetermined position relative to said first jaw containing member when said first jaw containing member is in a pivotally limited position which minimizes the distance between the jaws of said jaw containing members.

5. The nutcracker set forth in claim 1 wherein:
    said jaw containing members include cooperating conical recesses facing each other for receiving and supporting a nut during movement of said jaw containing members toward each other, at least one of said conical recess portions being provided with a plurality of circumferentially spaced ribs forming relief from said conical recess for effecting holding and cracking of a nutshell during movement of said jaw containing members toward each other.

6. The nutcracker set forth in claim 1 wherein:
    said means for oscillating said first jaw containing member includes motor means drivably connected to a shaft supported on said frame, a cam member drivably connected to said shaft including cam means engageable with cooperating cam surface means on said first jaw containing member for pivoting said first jaw containing member about said pivot axis toward said second jaw containing member.

7. The nutcracker set forth in claim 6 wherein:
    said first jaw containing member is movable relative to said cam and is biased toward said cam in any position of said cam member.

8. The nutcracker set forth in claim 7 wherein:
    said cam member includes radially projecting arm portions and opposed cams disposed on said arm portions, each of said cams being separately engageable with said cam surface means in response to rotation of said cam member to effect oscillating movement of said first jaw containing member.

9. The nutcracker set forth in claim 8 wherein:
    said cam member is of an elongated configuration and said opposed cams include a pair of cams with one of said pair being supported at one end of said cam configuration and the other of said pair being supported at the other end of said cam configuration.

10. The nutcracker set forth in claim 9 wherein:
    said cams comprise rollers engageable sequentially with the cooperating cam surface means on said first jaw containing member.

* * * * *